Dec. 17, 1957  G. ANGLADA DOMENECH ET AL  2,816,340

CONNECTING DEVICE

Filed Aug. 27, 1954  2 Sheets-Sheet 1

Inventors
G. Anglada Domenech
V. Anglada Domenech
By Glascock Downing Seebold
Attys.

Dec. 17, 1957   G. ANGLADA DOMENECH ET AL   2,816,340
CONNECTING DEVICE

Filed Aug. 27, 1954                                         2 Sheets—Sheet 2

Inventors
G. Anglada Domenech
V. Anglada Domenech
Attys.

United States Patent Office 2,816,340
Patented Dec. 17, 1957

2,816,340

CONNECTING DEVICE

Gerardo Anglada Domenech and Vicente Anglada Domenech, Barcelona, Spain, assignors to Waldes Kohinoor, Inc., Long Island City, N. Y.

Application August 27, 1954, Serial No. 452,672

Claims priority, application Spain September 18, 1953

7 Claims. (Cl. 24—217)

This invention relates to a connecting device permitting the joining and separation at will of two parts of a single object or of two parts of different objects which must be joined together for certain functions. The said parts, may be, for example, the flap of a wallet or purse and the body thereof, the hood of a touring car and the coachwork thereof or the like.

The device according to the invention comprises fundamentally the combination of three substantially cylindrical members, the diameters of which decrease in such manner that the said cylindrical members are successively contained one inside another. The outermost and innermost members are fixed to each of the two parts which it is desired to unite at will. The intermediate member comprises a resilient clamp made from sheet metal which has a base in the form of a slightly curved disc of spherical shape and provided on its periphery with a ring of fingers. As this base is slightly curved and made of resilient sheet metal, it is possible to change the direction of the curvature thereof when its central portion is subject to a suitable pressure, and the base can therefore assume two stable positions, one concave and one convex. Consequently, when passing from one stable position to the other stable position, the peripheral portion of the base of the disc undergoes a slight change in inclination which causes a correlative movement of the fingers of the peripheral ring with the fingers being thus moved towards or away from the centre when the shape changes from concave to convex or vice versa.

The two stable positions of the base are obtained according to the following physical principle. If a permanent deformation is made by stamping on a disc of flat sheet metal, and the stamping produces a slight permanent spherical curvature, the material will stretch and the disc will have become a spring with special features. If a pressure is then applied to the central portion of the disc in the opposite direction to that of the curvature, the material will be concentrically compressed and the maximum compression will occur when the flat position is again obtained with the flat position being now unstable. If the pressure ceases before the flat position is reached, the resiliency of the material will force the disc to reassume the initial curvature. However, if the pressure is applied until the unstable flat position is slightly overpassed, i. e. until the direction of the curvature is beginning to change, when the pressure ceases the disc will not re-assume its previous curvature but the resiliency of the material will tend to exaggerate in the disc a curvature in the new direction and will cause the disc to take a second stable position, in which second position the curvature will be the same as initially obtained by stamping but in the opposite direction. Two opposite stable positions will have thus been obtained and the change from one position to the other will occur by a sudden or snapping out movement. This physical principle is well known in the art since it is applied to certain conventional metallic stoppers of a similar shape to that of the resilient clamp, the stoppers being used individually to stopper bottles or receptacles in general.

It is an object of the present invention to provide a connecting device adapted to withstand forces much greater than would cause the separation of a pressure closure means of the conventional type.

It is another object of the invention to provide a laterally inaccessible arrangement which is therefore particularly well adapted to withstand possible pilfering.

It is another object of the invention to obtain the opening of the connecting device by means of exerting a suitable momentary pressure only, without it being necessary to maintain the said pressure during the separation of the two parts which the device connects.

It is another object of the invention to make possible the construction of connecting devices of relatively small axial dimensions.

These objects, and also other objects which will readily occur to those skilled in the art, will be described in the following description and claims and are illustrated in the accompanying drawings which refer by way of example to preferred embodiments.

In the drawings, wherein the same element always has the same reference number:

Figure 1:
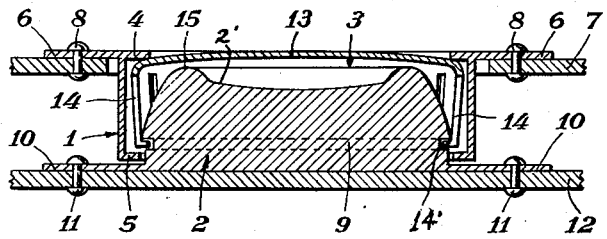
Figure 1 is an elevation through the diameter of a device, the resilient clamp being in the convex position corresponding to the joining of the two parts.

The three members mainly constituting the device are an outer casing 1, an inner male member 2 and a resilient clamp 3.

The outer casing 1 has the form of a substantially cylindrical short tube or ring having upper and lower flanges 4 and 5 respectively which are inwardly directed. Ribs 6 serve to fix the casing to one of the parts 7 to be joined, rivets 8 or other equivalent means being employed.

Figure 2:
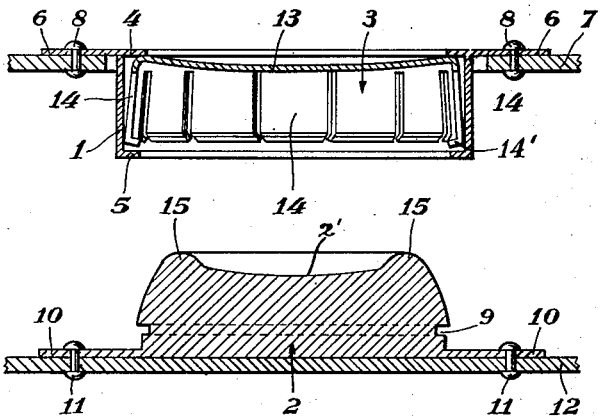
Figure 2 is a similar view, the resilient clamp being in the concave position corresponding to the separation of the two parts.
Figure 3:
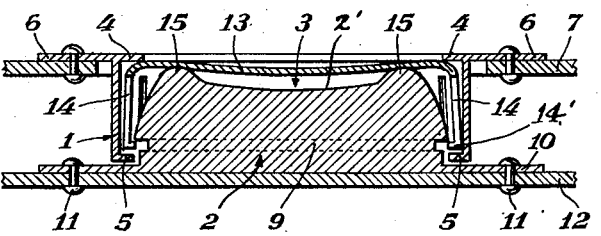
Figure 3 is a similar view to that of Figures 1 and 2, the two parts being separated but close to one another.
Figure 4:
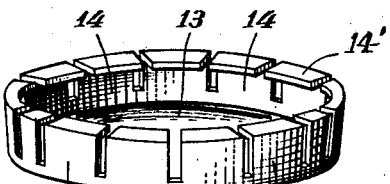
Figure 4 is a perspective of the resilient clamp in an upside down position as compared with the previous figures, in order to clearly show the ring of fingers.
Figure 5:
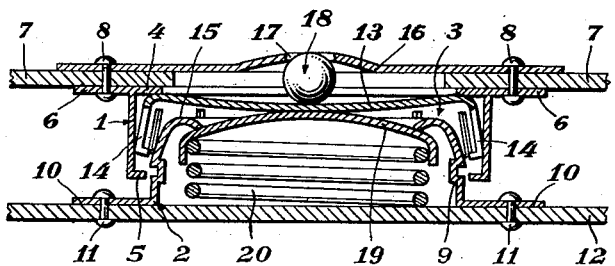
Figure 5 is a sectional view, in a similar position to that of Figure 3, of an arrangement having an expelling means and an impelling means.
Figure 6:
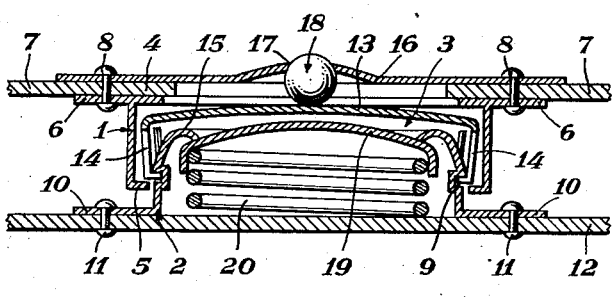
Figure 6 is a sectional view through the device as shown in Figure 5 after the two parts have been connected, i. e. in a similar position to that of Figure 1.

The male member 2, which is also of substantially cylindrical shape (solid in the example as shown in Figures 1, 2, and 3, and hollow in the example as shown in Figures 5 and 6), has on its lateral surface near its lower end a depression in the form of a circular recess 9. Ribs 10 and rivets 11 serve to fix the male member 2 to the second part 12 which it is desired to join to the part 7. The male member 2 has, in its free end, a small cavity 2' which is limited in its periphery by a forward flange 15 in the form of a circular projection. As a consequence, the central portion of the said male member 2 cannot prevent the curved disc 13 of the resilient clamp 3 from assumping the stable concave position and, at the same time, it is insured that, when the said disc 13 is in the said concave position, the contact between the curved disc 13 and the male member 2 can only be effected through the said forward flange 15. Furthermore, the diameter of the forward flange 15 is less than the internal diameter of the upper flange 4 of the outer casing 1, and, consequently, when the upper flange 4 and the forward flange 15 are simultaneously applied against the curved disc 13 in opposite directions, an identical effect is obtained to that which would be obtained by applying upwardly a pressure against the central portion of the curved disc 13.

The resilient clamp 3, which, as above stated, is made from sheet metal, has a base in the form of a curved disc 13 and is provided in the periphery with a ring of fingers 14. The fingers consist of radial prolongations of the said disc 13, all folded to one side until each finger is adjacent to its neighboring fingers, with each finger ending with an inwardly folded end 14'. The maximum external diameter of the resilient clamp 3 is equal to the internal diameter of the outer casing 1 and the height of the resilient clamp 3 is slightly less than the separation between the flanges 4 and 5 of the outer casing 1. The outer casing 1 thus retains, permanently and freely, in its interior the resilient clamp 3, which remains free to assume its two stable positions, without there being, however, any possibility of the resilient clamp 3 moving out of the outer casing 1 because the flanges 4 and 5 will prevent such action. In the position illustrated in Figures 2, 3 and 5, the curve of the disc 13 of the resilient clamp 3 has the stable concave shape and the gripping members 14 are divergent, permitting the male member 2 to enter and egress freely. In the position illustrated in Figures 1 and 6, the curved disc has the stable convex shape and here the gripping members 14 have undergone a centripetal displacement and their ends are lodged in the circular recess 9 in the male member 2. Since the outer casing 1, because of the flanges 4 and 5, permanently retains in its interior the resilient clamp 3, the introduction of the gripping members 14 into the circular recess 9 produces a connection between the male member 2 and the outer casing 1 and therefore also produces an indirect connection of the part 7 and part 12 fixed to the outer casing and male member respectively, as in that position the lower flange 5 cannot move upwardly because the ends of the fingers 14 accommodated in the circular recess 9 prevent such movement of the male member.

When the device is in the closed position (Figures 1 and 6), and if the convexed disc 13 is pressed inwardly directly or indirectly, the convexure is reversed, the gripping members 14 separate and the connection between 7 and 12 is broken.

When the device is in the concave shape and therefore open (Figure 3), the closed position is reached in the following way. A pressure is exerted from the exterior against part 7 or against the upper flange 4 of the outer casing 1 which causes the flange 4 to peripherally press on the curved disc 13 applying the disc against the forward flange 15 of the male member 2. Under those conditions, as previously stated, an effect is obtained which is equivalent to a pressure exerted upwardly against the central portion of the curved disc 13, and the disc is therefore forced to reverse its curvature and to pass from the concave position (Figure 3) to the convex position (Figure 1), which results again in the closing of the device and, consequently, in the desired connection between part 7 and part 12.

The embodiment illustrated in Figures 5 and 6 corresponds to a device according to the invention wherein operation is facilitated through the agency of an impelling and expelling means. In this example, there have been provided in addition to the elements indicated in the foregoing examples, a cover 16 with central aperture 17, a ball-shaped impelling means 18 placed between the cover 16 and the curved disc 13; an expelling means comprising the inverted dish-shaped member 19 and a helicoidal spring 20 urging the member 19 upwardly. The impelling means 18, some of which projects to the outside through the aperture 17, makes it possible to apply indirectly from outside a force to the curved disc 13, thus facilitating the passage thereof from its convex position (Figure 6) to its concave position (Figure 5). Once the disc 13 has reached the concave position, with the result that the resilient clamp 3 has been disconnected from the male member 2 the expelling means acts, through the medium of the member 19, against the lowest point of the disc 13 so that there then occurs automatically an initial separation of the two groups of members which respectively incorporate each half of the device, this step later facilitating the complete separation of the device.

Figure 7:
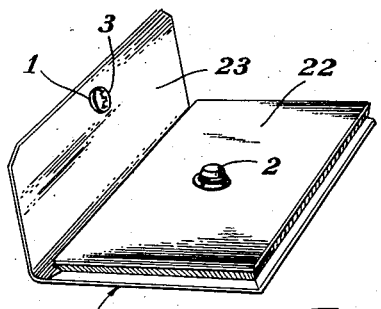
Figure 7 is a perspective of a wallet fitted with the device according to the invention.

Figure 7 illustrates a wallet 21 of which there can be seen the body 22 and closure flap 23 which fulfil respectively the functions performed by the parts 12 and 7 in Figures 1 to 3 and 5 to 6. A male member 2 is fixed to the body 22 and an outer casing 1 is fixed to the closure flap 23 and has in its interior a resilient clamp 3. If the flap 23 is turned to the right until it is applied to the body 22, the resilient clamp 3 is applied against the male member 2. Then, if the resilient clamp 3 is in the open position, when a pressure is applied on the upper flange of the outer casing 1, a reversing of the curvature of the resilient clamp is obtained due to the action explained in column 3, lines 49 to 62, whereupon the desired connection occurs between the flap 23 and the body 22.

From the foregoing it will be apparent that we have evolved a connecting device which is of simple structure, cheap to manufacture and which fulfils efficiently the task for which it is designed.

It will be understood that additional modifications can be made to the size, shape and construction of the various members of our connecting device, which modifications may replace the arrangements hereinbefore described and illustrated without departing from the scope of our invention as defined in the following claims.

What we claim is:

1. A device for connecting two parts comprising in combination a sheet metal resilient clamp having a base defined as a curved disc and adapted to assume a stable concave position and a stable convex position, the base having on its periphery a ring of fingers, the said fingers being radial prolongations of the said disc folded so that each finger is adjacent to its neighboring fingers, each finger ending with an inwardly folded end, the said ends being distributed over a circumference of greater diameter in the concave position of the curved disc than in the convex position of the disc, an outer casing attachable to one of the two parts comprising an outer ring having at the top and bottom inwardly directed flanges of such dimensions that the outer casing surrounds the resilient clamp and retains the same permanently in the interior of the casing, and a male member having in its side a circular depression adapted to accommodate the end of the fingers of the clamp and the said male member being provided in its forward part with a circular flange, the length of the male member and the diameter of the flange being such that, when the male member is introduced with force into the resilient clamp situated in the concave position, the said flange is applied to the said curved disc, and the said flange forces the said disc to effect a change of curvature from the concave to convex.

2. The invention as set forth in claim 1, including an expelling means situated within the male member and adapted to separate the outer casing and the said male member, the said expelling means comprising a helicoidal spring and a disc-shaped member urged by the said spring, the said disc-shaped member acting against the lowest point of the curved disc of the resilient clamp when the said disc has assumed the said concave position.

3. The invention as set forth in claim 1, including a plate provided with a central aperture and fixed above the outer casing, a ball situated between the curved disc of the resilient clamp and the said plate in such manner as to project partially towards the exterior through the said central aperture, and an expelling means situated within the male member and adapted to separate the outer casing and the said male member, the said expelling means comprising a helicoidal spring and a disc-shaped member urged by the said spring, the said disc-shaped member acting against the lowest point of the curved disc of the resilient clamp when that said disc has assumed the said concave position.

4. The invention as set forth in claim 1, including an impelling means which partially projects to the exterior and which is applied centrally to the curved disc of the resilient clamp.

5. The invention as set forth in claim 1, including a plate provided with a central aperture and fixed above the outer casing, and a ball situated between the curved disc of the resilient clamp and the said plate in such manner as to project partially towards the exterior through the said central aperture.

6. A device for connecting two parts comprising in combination a sheet metal clamp having a base defined as a curved disc and adapted to assume a stable concave position and a stable convex position, the base having on its periphery a ring of fingers, the said fingers being radial prolongations of the disc folded so that each finger is adjacent to its neighboring fingers, each finger ending with an inwardly folded end, the said ends being distributed over a circumference of greater diameter in the concave position of the curved disc than in the convex position of the disc, an outer casing attachable to one of the two parts, means on the casing for permanently retaining in its interior the resilient clamp, and a male member attachable to the other of the two parts, the male member being provided in its side with a circular depression adapted to accommodate the ends of the fingers of the clamp.

7. A device for connecting two parts comprising in combination a sheet metal resilient clamp having a base defined as a curved disc and adapted to assume a stable concave position and a stable convex position, the base having on its periphery a ring of fingers, the said fingers being radial prolongations of the said disc folded so that each finger is adjacent to its neighboring fingers, each finger ending with an inwardly folded end, the said ends being distributed over a circumference of greater diameter in the concave position of the curved disc than in the convex position of the disc, an outer casing attachable to one of the two parts, means on the casing for permanently retaining in its interior the resilient clamp, and a male member attachable to the other of the two parts, the male member having in its side a circular depression adapted to accommodate the ends of the fingers of the clamp, the said male member being, in the portion adjacent to the circular depression towards the free end of the said male member, of a diameter located between two limits, the upper limit being the diameter of the circumference determined by the ends of the fingers of the resilient clamp in the concave position of the curved disc and the lower limit being the diameter of the said circumference in the convex position of the curved disc.

References Cited in the file of this patent

UNITED STATES PATENTS

| | | |
|---|---|---|
| 586,118 | Dowse | July 13, 1897 |
| 2,656,578 | Tworek | Oct. 27, 1953 |